United States Patent [19]

Asai

[11] Patent Number: 5,247,400
[45] Date of Patent: Sep. 21, 1993

[54] TAPE REPRODUCING DIRECTION DETECTING APPARATUS FOR A DIGITAL VTR

[75] Inventor: Toshiya Asai, Kanagawa, Japan

[73] Assignee: Sony Corporation, Tokyo, Japan

[21] Appl. No.: 834,366

[22] Filed: Feb. 12, 1992

[30] Foreign Application Priority Data

Feb. 19, 1991 [JP] Japan .................................. 3-024790

[51] Int. Cl.⁵ .............................................. H04N 5/78
[52] U.S. Cl. .................................. 360/33.1; 360/74.4;
369/32; 358/335
[58] Field of Search ................ 360/33.1, 69, 71, 74.1,
360/74.4, 38.1, 36.1, 18, 27; 358/335, 907;
369/32, 44.28

[56] References Cited

U.S. PATENT DOCUMENTS 4,549,234 10/1985 Sakamoto ..................... 360/77.13 X
4,660,086 4/1987 Lemelson ...................... 360/38.1 X
4,766,507 8/1988 Kashida et al. ................. 360/74.4 X Primary Examiner—Andrew L. Sniezek
Attorney, Agent, or Firm—Alvin Sinderbrand; William S. Frommer

[57] ABSTRACT

A tape reproducing direction detecting apparatus for a digital VTR in which a reproducing direction of a tape on which each field of a digital video signal is recorded over a plurality of predetermined slant tracks together with a field identifier and a segment identifier is comprised of a track number generating circuit for generating track numbers corresponding to a plurality of the slant tracks on the basis of the field identifier and the segment identifier, and a track number detecting circuit for detecting the increase and decrease of the track numbers.

6 Claims, 5 Drawing Sheets

TAPE REPRODUCING DIRECTION DETECTING APPARATUS FOR A DIGITAL VTR

BACKGROUND OF THE INVENTION

1. Field of the Invention

The present invention generally relates to a tape reproducing direction detecting apparatus and, more particularly, is directed to a tape reproducing direction detecting apparatus for a digital VTR (video tape recorder) of component system.

2. Description of the Prior Art

A D-1 type VTR (i.e., so-called 4:2:2 digital VTR) has been known to digitally record a component video signal (formed of a luminance signal Y and red and blue color difference signals R-Y and B-Y).

According to the D-1 type digital VTR, as shown in FIG. 1, a slant track called "program track" is comprised of two video sectors (half tracks) Sv for video data and four audio sectors Sa for audio data. An inclined angle (track angle) of this program track is a little larger than 5 degrees. A cue audio track Tka, a servo control track Tkc and a time code track Tkt are provided in the longitudinal direction of a tape T. The aforesaid track pattern is made common to both the 525/60 standard system (i.e., NTSC system) having 525 horizontal lines and a nominal field frequency of 60 Hz and the 625/50 standard system (i.e., PAL system) having 625 horizontal lines and a field frequency of 50 Hz.

The D-1 type digital VTR employs a 4-channel processing system in order to reduce a transmission rate of mass data. As, for example, shown in FIG. 2, four magnetic heads HA, HB and HC, HD are paired to provide two sets and two sets of magnetic heads HA, HB and HC, HD are mounted on a rotary drum D with an angular extent of 180 degrees. The magnetic tape T is wrapped around the rotary drum D over a tape wrapping angle of 180 degrees and two slant tracks shown in FIG. 1 are sequentially formed on the magnetic tape T.

Owing to the above-mentioned 4-channel processing, in the case of the 525/60 standard system, one field of video data is recorded over 20(=4×5) half tracks (video sectors) S1 to S20 corresponding to 10 slant tracks as shown by solid lines in FIG. 3. On the other hand, in the case of the 625/50 standard system, although the transmission rate of data is the same, the field period is longer so that one field of video data is recorded over 24 video sectors S1 to S24 corresponding to 12 slant tracks involving additional four video sectors S21 through S24 shown by phantoms in FIG. 3. In both cases, the hatched four sectors S1 to S4 correspond respectively to the four magnetic heads HA through HD and compose a set of segment. Also, the recording of one field of video data is started from the sectors S1 and S2 which are formed from substantially the center of the magnetic tape (upper side of FIG. 3) and ended with the ends of the sectors S19, S20 or S23, S24 which are formed near the control track Tkc (see FIG. 1).

The D-1 VTR carries out a pair of error corrections called "inner correction" and "outer correction" by utilizing a product block involving the Reed Solomon correction code. The outer code block is comprised of 30 bytes of video or audio data (column) and 2 bytes of Reed Solomon correction code added thereto, while the inter code block is comprised of 60 bytes of video or audio data (row) and 4 bytes of Reed Solomon correction code.

Video data are arrayed in each video sector in the units of a synchronizing (i.e., sync.) block shown in FIG. 4. Each sync. block is composed of 2 bytes of a sync. word, 4 bytes of a block identifier (ID) and two inner code blocks. Each identifier involves a sync. block ID for numbering respective blocks along a program track, a sector ID, a segment ID and a field ID for numbering respective sync. blocks in accordance with the sector, segment and field positions.

The field IDs shown by reference symbols F in FIG. 3 are repeatedly given at a 4-field cycle in the sequence of 0, 1, 2, 3 in that order. Also, the segment ID is given in the sequence of 0 to 4 in the case of the 525/60 standard system and is given in the sequence of 0 to 5 in the case of the 625/50 standard system.

Because of the aforesaid track pattern, the D-1 VTR cannot reproduce one field of video data by one revolution of the rotary drum D even in the normal playback mode. For this reason, a video frame memory having a capacity of 3 fields or more is mounted on the playback side, whereby one field of complete video data is stored in this video frame memory and then sequentially output. The 3 fields of video data are composed of 2 fields of write data and one field of read data and in the slow motion playback mode, a memory having a capacity of 2 fields is needed for write data.

In the slow motion playback mode and in the 1/n slow motion mode, it takes n fields of time to reproduce one field of video data. Then, during the present field of video data is reproduced, a preceding field of video data is repeatedly read out from the video frame memory.

When the dynamic tracking is not carried out, then each magnetic head obliquely scans the program tracks to reproduce data. Also in this case, by the aforementioned error correction, a perfect or substantially perfect reproduced picture can be obtained within the $\pm\frac{1}{4}$ normal tape speed reproduction mode.

According to the conventional D-1 VTR, when the tape transport direction is changed in the forward and reverse directions particularly in the slow motion playback mode, then the reproducing direction is determined by the forward and reverse sequences of the field ID in the reproduced data to thereby control the write and read of the frame memory.

However, in the video tape edited in the unit of frame or field because of the purpose for producing a video program, and the sequences of the field IDs become discontinuous as in 0-1-0-1 before and after the editing point.

When such video tape is reproduced, then the conventional D-1 VTR erroneously determines that the tape running direction is changed in the forward, reverse and forward directions so that data are read out from the video frame memory in the sequence of, for example, the preceding field, the field preceding the preceding field and the preceding field, in that order. There is then the problem such that the motion of the reproduced picture is disturbed.

Further, according to the conventional D-1 VTR, the reproducing direction is determined by detecting the sequence of the field ID in the reproduced data so that the reproducing direction cannot be determined until the switching of the field ID is detected. Therefore, it is frequently observed that the switching control of the frame memory is delayed.

As a consequence, if the tape running direction is switched in the middle of one field period in the slow motion playback mode, then incomplete video data of less than one field is stored in the video frame memory and this incomplete video data is read out from the video frame memory, thereby a reproduced picture being disturbed.

OBJECTS AND SUMMARY OF THE INVENTION

Accordingly, it is an object of the present invention to provide an improved tape reproducing direction detecting apparatus for a digital VTR in which the aforesaid shortcomings and disadvantages encountered with the prior art can be eliminated.

More specifically, it is an object of the present invention to provide a tape reproducing direction detecting apparatus for a digital VTR in which a tape running direction can be detected rapidly and reliably upon reproduction.

Another object of the present invention is to provide a tape reproducing direction detecting apparatus for a digital VTR for use with both 525/60 standard system and 625/50 standard system.

As an aspect of the present invention, a tape reproducing direction detecting apparatus for digital VTR is provided, in which a reproducing direction of a tape in which each field of a digital video signal is recorded over a plurality of predetermined slant tracks together with a field identifier and a segment identifier. This tape reproducing direction detecting apparatus is comprised of a track number generating circuit for generating track numbers corresponding to a plurality of the slant tracks on the basis of the field identifier and the segment identifier, and a track number detecting circuit for detecting the increase and decrease of the track numbers.

The preceding and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 5:
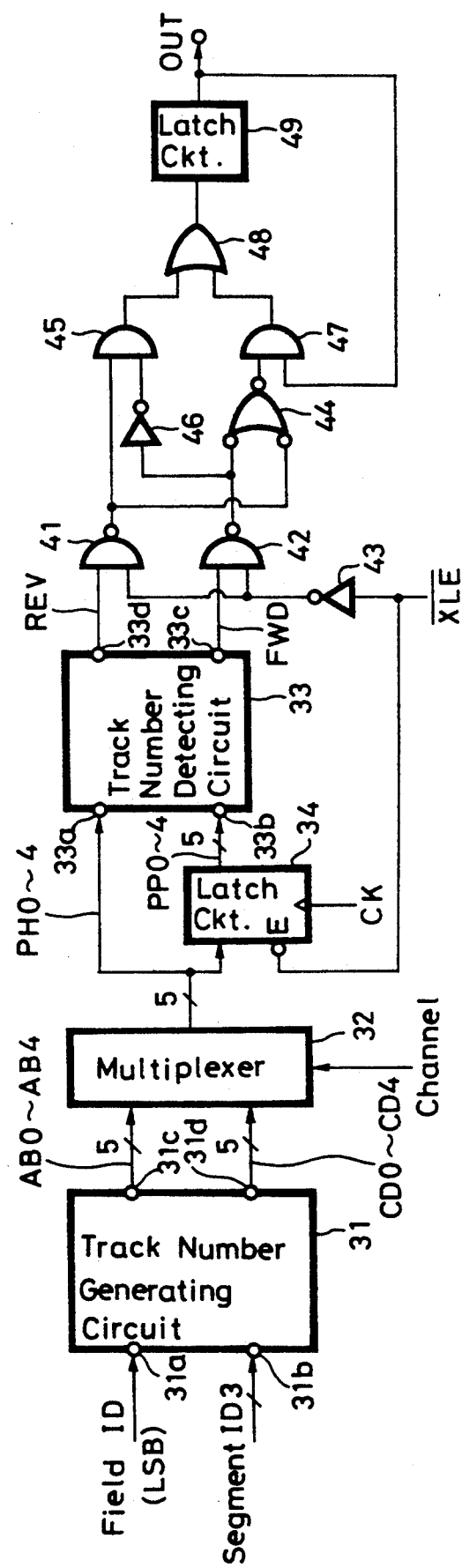
FIG. 5 is a block diagram showing an arrangement of a main portion of an embodiment of the tape reproducing direction detecting apparatus according to the present invention.
Figure 6:
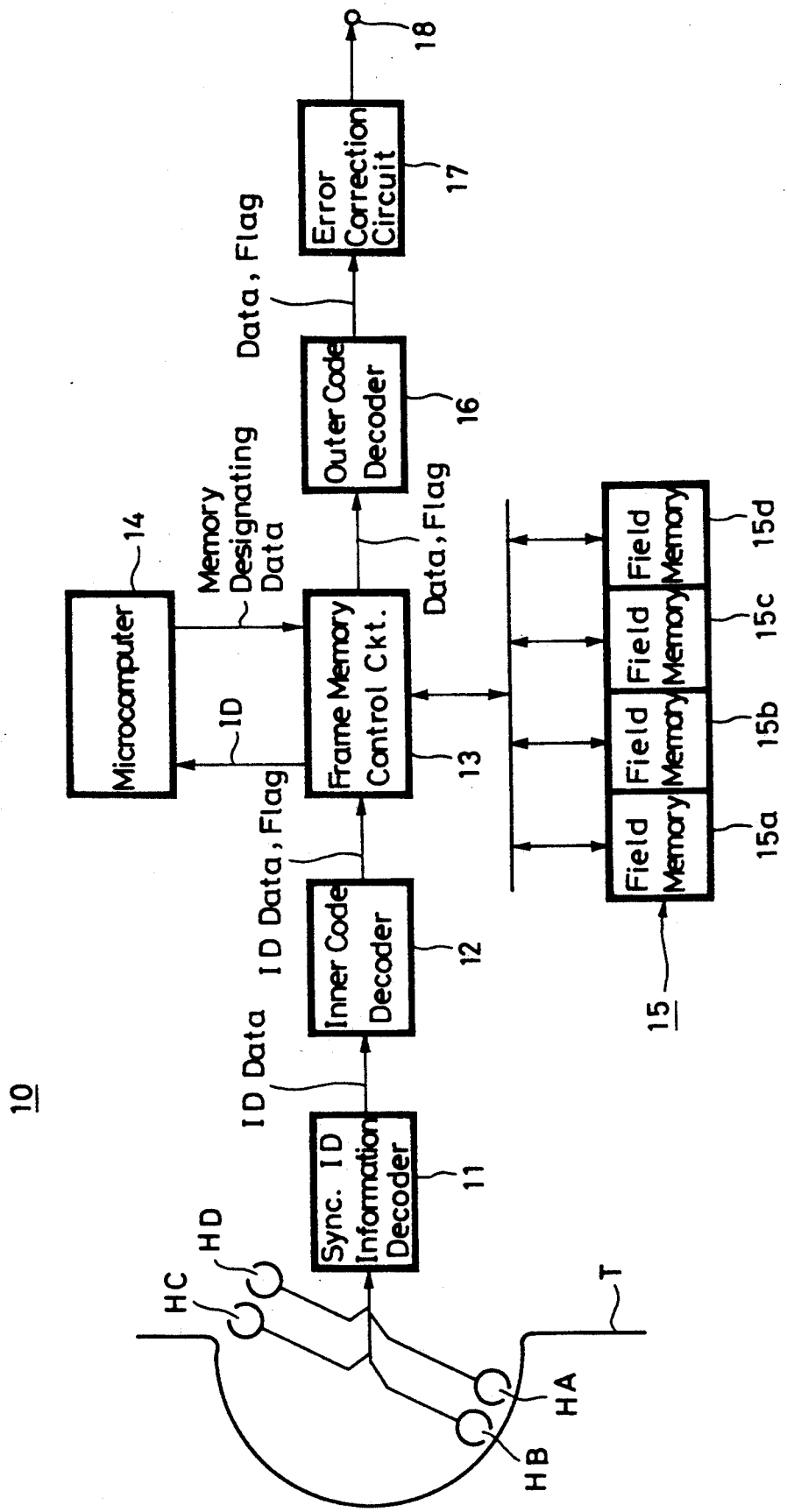
FIG. 6 is a block diagram showing an overall arrangement of the embodiment of the present invention.
Figure 7:
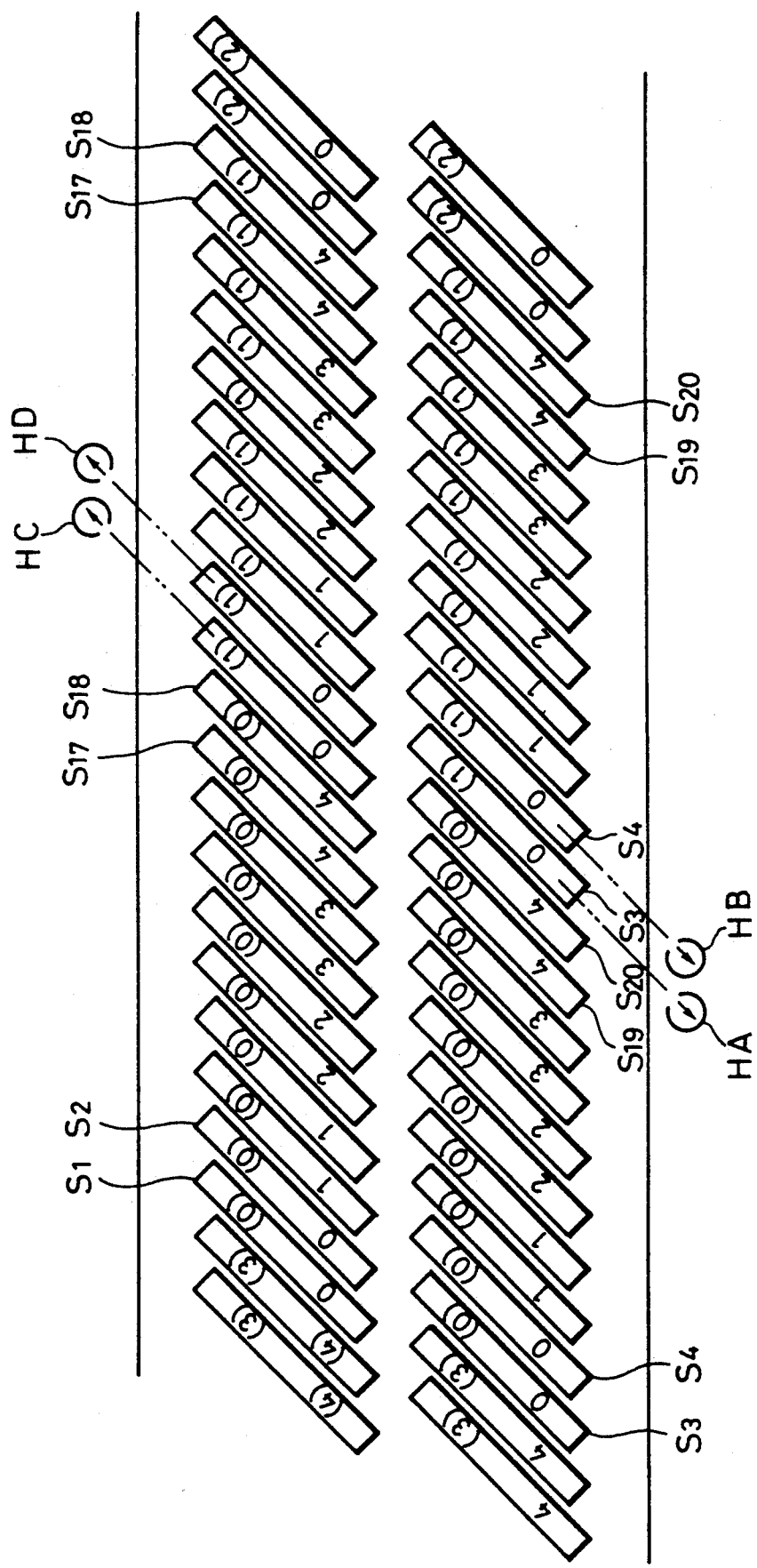
FIG. 7 is a schematic diagram showing a track pattern according to the embodiment of the present invention.

With reference to FIGS. 5 through 7, let us describe an embodiment of an apparatus for detecting a tape reproducing direction of a digital VTR according to the present invention which is applied to the D-1 VTR of the 525/60 standard system.

FIG. 6 shows an overall arrangement of the embodiment of the present invention and FIG. 5 shows a circuit configuration of a main portion of this embodiment.

Referring to FIG. 6, reference numeral 10 designates a reproducing system of the D-1 VTR in which reproduced data from rotary magnetic heads HA through HD are supplied through a sync. ID information decoder 11 and an inner code decoder 12 to a frame memory control circuit 13. The frame memory control circuit 13 includes a reproducing direction detecting circuit which will be described later. The frame memory control circuit 13 is connected with a microcomputer 14 for the control of memory and is also connected with a video frame memory 15 (video field memories 15a to 15d) of a capacity of 4 fields. An output of the frame memory control circuit 13 is supplied through an outer code decoder 16 and an error correction circuit 17 to an output terminal 18.

As shown in FIG. 5, a reproducing direction detecting circuit generally depicted by reference numeral 30 is mainly composed of a track number generating circuit 31 and a track number detecting circuit 33.

A field ID (LSB) and a segment ID3 are respectively supplied to a pair of input terminals 31a and 31b of the track number generating circuit 31 and track numbers generated on the basis of both the field ID and segment ID3 by the track number generating circuit 31 are supplied from a pair of output terminals 31c, 31d thereof to a multiplexer (change-over switch) 32. An output of the multiplexer 32 is directly supplied to one input terminal 33a of the track number detecting circuit 33 and is also supplied through a latch circuit 34 to the other input terminal 33b thereof. A channel ID corresponding to the magnetic heads HA through HD is supplied to the multiplexer 32 as a control signal and a predetermined enable signal XLE* is supplied to the latch circuit 34 at every sync. block of reproduced data. In this specification, asterisks attached to the end of signal names indicate that those signals are negative in polarity.

Forward direction and reverse direction detection outputs FWD and REV are respectively supplied from a pair of output terminals 33c and 33d of the track number detecting circuit 33 to NAND gates 41 and 42 and, an enable signal XLE* is commonly supplied to the AND gates 41 and 42 through an inverter 43. Outputs of the two NAND gates 41 and 42 are supplied to an AND gate 44. The output of one AND gate 41 is directly supplied to to an AND gate 45 and the output of the other NAND gate 42 is supplied to the AND gate 45 through an inverter 46. An output of the AND gate 44 is supplied to the other AND gate 47, while outputs of the two AND gates 45 and 47 are supplied through an OR gate 48 and a latch circuit 49 to an output terminal OUT and also supplied to the AND gate 47. The circuit scale of the above-mentioned reproducing direction detecting circuit 30 is about 100 gates at most.

Operation of this embodiment will be described below also with reference to FIG. 7.

In this embodiment, since five slant tracks recorded by the magnetic heads HA, HB; HC, HD are respectively formed within one frame for the 4-channel processing as shown in FIG. 7, track numbers are generated by the track number generating circuit 31 on the basis of the above-mentioned field ID and the segment ID as shown on the following table 1 and respectively associated with the slant tracks.

TABLE 1

| channel (recording head) | field ID | segment ID | track number |
|---|---|---|---|
| CHA, CHB | 1, 3 0, 2 | 4 0 | 0 |
|  |  | 1 2 | 1 |
|  |  | 3 4 | 2 |
|  | 1, 3 | 0 1 | 3 |
|  |  | 2 3 | 4 |
| CHC, CHD | 0, 2 | 0 1 | 0 |
|  |  | 2 3 | 1 |
|  |  | 4 | 2 |
|  | 1, 3 | 0 1 2 | 3 |
|  |  | 3 4 | 4 |

As is apparent from the above-mentioned table 1, the same track numbers are allocated at every frame to the slant tracks scanned by the magnetic heads HA, HB; and HC, HD in the normal playback mode, thereby the corresponding relation between different field IDs and segment IDs for each head pair being simplified. Then, by detecting the increase and decrease of the track number by the track number detecting circuit 33, the increase and decrease of the segment IDs can be equivalently detected, thus making it possible to detect the reproducing direction rapidly.

Figure 1:
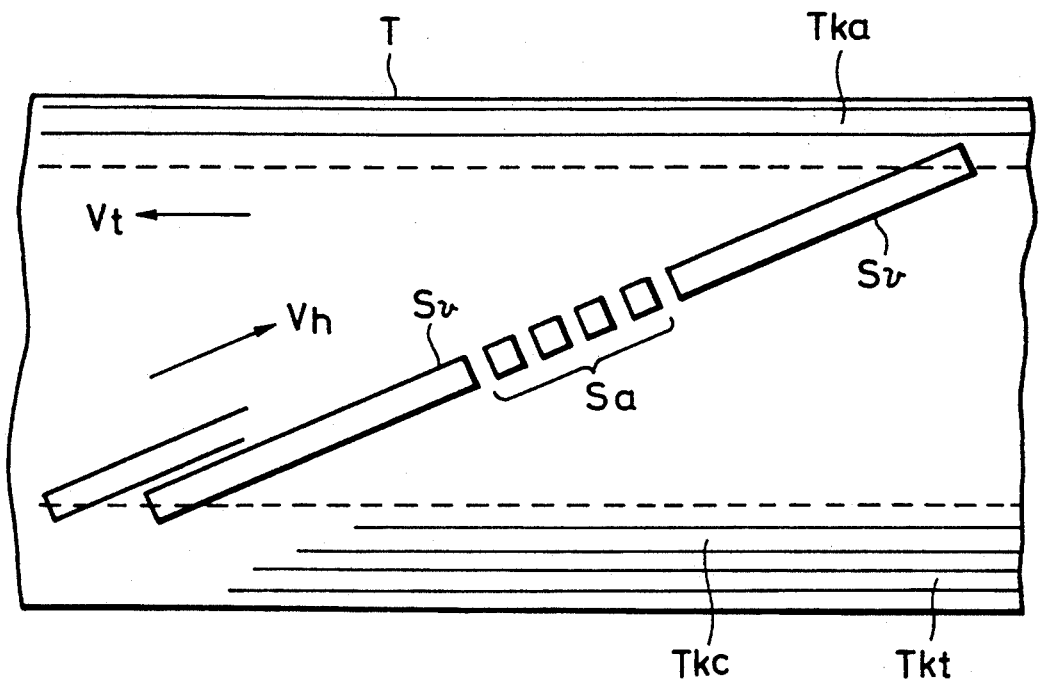
FIG. 1 is a schematic diagram showing an example of a track pattern formed by a digital VTR, and to which references will be made in explaining the present invention.
Figure 2:
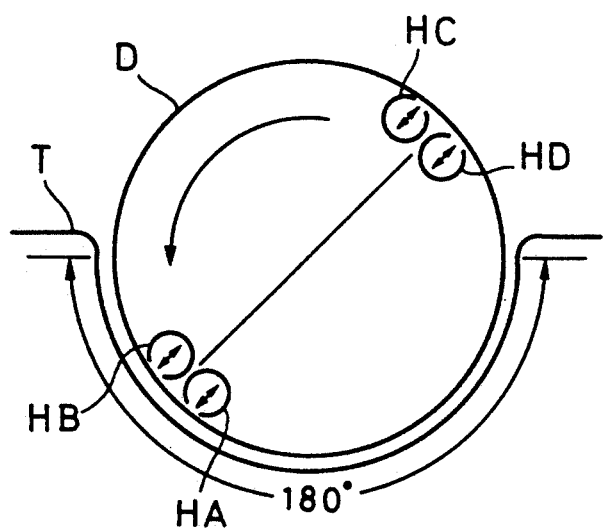
FIG. 2 is a plan view illustrating a main portion of the digital VTR, i.e., a rotary head drum assembly, and to which references will be made in explaining the present invention.
Figure 3:
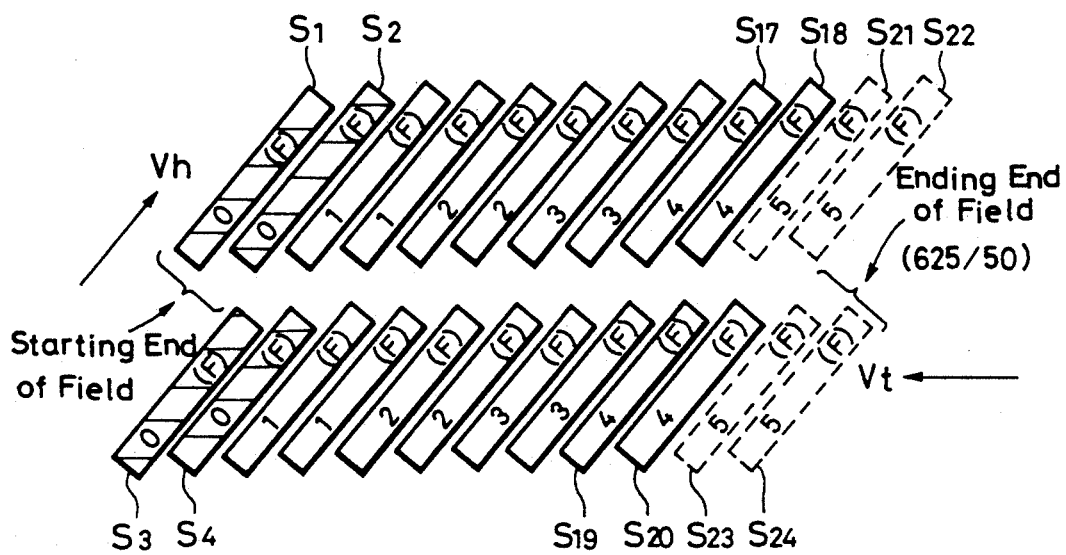
FIG. 3 is a schematic diagram of a recording format of the digital VTR, and to which references will be made in explaining the present invention.
Figure 4:
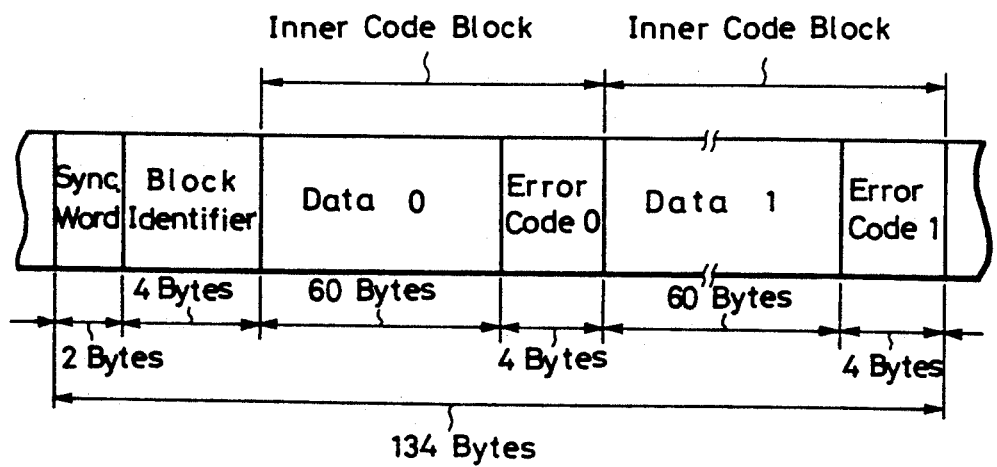
FIG. 4 is a format of a synchronizing block useful for explaining the present invention.

In the inner code decoder 12 shown in FIG. 6, a random error is corrected by the error code in the sync. block shown in FIG. 4 and an ID information, reproduced data and a flag are supplied to the frame memory control circuit 13. The ID information is supplied from the memory control circuit 13 to the microcomputer 14. In response to this ID information, the microcomputer 14 supplies the memory control circuit 13 with a memory designating signal so that the frame memory control circuit 13 may designate a desired one of the four field memories 15a through 15d in and from which data is written and read out. An address, data and a strobe signal are supplied to each of the field memories 15a through 15d from the memory control circuit 13.

As earlier noted, the frame memory control circuit 13 includes the reproducing direction detecting circuit 30, from which the ID information is supplied to the microcomputer 14 as the reproducing direction detecting signal. Although the ID information is usually generated on the basis of the field ID in the prior art, the ID information is generated on the basis of also the segment ID in this embodiment.

The reproduced data and flag from the frame memory control circuit 13 are corrected in burst error by the outer code decoder 16 and the reproduced data and the flag from the outer code decoder 16 are error-corrected by the error correcting circuit 17 and then video data is fed to the output terminal 18.

The track number generating circuit 31 of FIG. 5 generates the track numbers shown on the aforesaid table 1 on the basis of the field ID (LSB) and the segment ID as described hereinbefore, whereby track numbers AB0 through AB4 of the two channels CHA and CHB corresponding to one head pair HA, HB and track numbers CD0 through CD4 of the two channels CHC and CHD corresponding to the other head pair HC, HD are supplied from output terminals 31c and 31d thereof to the multiplexer 32. The multiplexer 32 is controlled by the channel ID generated separately so as to selectively output track numbers corresponding to the tracks scanned by the four heads HA through HD from the track number groups AB0 to AB4; CD0 to CD4 supplied thereto from the output terminals 31c, 31d of the track number generating circuit 31.

The track number detecting circuit 33 compares present track numbers PH0 to PH4 directly supplied thereto from the multiplexer 32 and preceding track numbers PP0 to PP4 supplied thereto via the latch circuit 34 to detect the increase and decrease of the track number, that is, the increase and decrease of the segment ID equivalently, thereby the reproducing direction being detected. Then, forward direction and reverse direction detection outputs FWD and REV are supplied to the output terminals 33c and 33d of the track number detecting circuit 33, respectively.

In the forward direction reproducing mode, the forward direction detection output FWD goes logic "1" high level and the reverse direction detection output REV goes logic "0" low level, while in the reverse direction reproducing mode the forward direction detection output FWD goes logic "0" low level and the reverse direction detection output goes logic "1" high level.

In the case of the forward direction playback mode, when the enable signal XLE* goes logic "0" low level only during, for example, one clock period at every sync. block of reproduced data, then the NAND gates 41 and 42 generate outputs "1" and "0", respectively and the inverter 46 generates an output "1" so that the output of the AND gate 45 goes logic "1" high level. The output of the AND gate 45 is supplied through the OR gate 48 and the latch circuit 49 to the AND gate 47 with a delay of one clock period.

During the enable signal XLE* is at logic "0" low level, the output "0" of the AND gate 44 is supplied to the AND gate 47 so that the output of the AND gate 47 goes logic "0" low level. At that time, when the clock CK to the latch circuit 34 rises, then the latch circuit 49 latches a logic "1" high level which is ORed output of the output "1" of the AND gate 45 and the output "1" of the AND gate 47 by the OR gate 48. This logic high "1" level indicates the forward direction reproduction.

When the enable signal XLE* goes logic "1" high level, the output of the AND gate 44 goes logic "0" low level so that the latch circuit 49 holds the value "1" indicative of the forward direction reproduction latched by the clock CK before the enable signal XLE* goes logic "1" high level. Thus, the reproducing direction detecting circuit 30 detects the forward direction reproduction.

In the case of the reverse direction playback, when the enable signal XLE* goes "0" low level, conversely, the two AND gates 41 and 42 generate outputs of "0" and "1" respectively so that the output of the inverter 46 goes logic "0" low level, thereby making the output of the AND gate 45 go logic "0" low level. Also, since the output of the AND gate 44 goes logic "0" low level and the output of the succeeding AND gate 47 also goes logic "0" low level, the outputs of the OR gate 48 and the latch circuit 49 go logic "0" low level, thus making it possible for the reproducing direction detecting circuit 30 to detect the reverse direction reproduction.

When the detection outputs FWD and REV of the track number detecting circuit 33 are both at logic "0" low level, if the enable signal XLE* goes logic "0" low level, then both outputs of the NAND gates 41 and 42 go logic "1" high level and the output of the inverter 46 goes logic "0" low level so that the output of the AND gate 45 goes logic "0" low level. However, the output of the AND gate 44 goes logic "1" high level and the output of the latch circuit 49 is returned to the AND gate 49 so that the latch circuit 49 holds the value latched before the detection outputs FWD and REV both go logic "0" low level. Thus, the reproducing direction detecting circuit 30 detects the same reproducing direction as that detected before the detection outputs FWD and REV both go logic "0" level.

While the reproducing direction can be detected by detecting the increase and decrease of the track numbers in one scanning as described above, it is possible to obtain a more reliable reproducing direction information by detecting the reproducing direction after the change of the track number in the same direction was detected a plurality of times.

While the present invention is applied to the D-1 VTR of the 525/60 standard system as described above, it is needless to say that the present invention can be applied to the D-1 VTR of the 626/50 standard system in exactly the same manner.

As set out above in detail, according to the present invention, since the component type digital VTR is provided at its reproducing side with the ID detecting circuit for detecting the increase and decrease of the field ID and segment ID recorded on the tape together with the digital video signal and the tape reproducing direction is detected on the basis of the increase and decrease of the segment ID in the reproduced data, it is possible to obtain the tape reproducing direction detecting apparatus for digital VTR which can detect the tape running direction more reliably as compared with the conventional case such that the tape reproducing direction is detected by detecting the increase and decrease of only the field ID.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A tape reproducing direction detecting apparatus for a digital VTR in which a reproducing direction of a tape on which each field of a digital video signal is recorded over a plurality of predetermined slant tracks together with a field identifier and a segment identifier, comprising:
   (a) a track number generating circuit for generating track numbers corresponding to a plurality of said slant tracks on the basis of said field identifier and said segment identifier; and
   (b) a track number detecting circuit for detecting the increase and decrease of said track numbers.

2. A tape reproducing direction detecting apparatus for a digital VTR according to claim 1, further comprising a multiplexer and a latch circuit in which said track numbers are supplied to said multiplexer and an output from said multiplexer is supplied directly to one input terminal of said track number detecting circuit and also to the other input terminal thereof through said latch circuit.

3. A tape reproducing direction detecting apparatus for a digital VTR according to claim 2, further comprising means for supplying a channel ID to said multiplexer as a control signal and means for supplying a predetermined signal to said latch circuit.

4. A tape reproducing direction detecting apparatus for a digital VTR according to claim 2, further comprising a logic circuit connected to an output terminal of said track number detecting circuit.

5. A tape reproducing direction detecting apparatus for a digital VTR according to claim 4, further comprising means for supplying an enable signal to said logic circuit through an inverter.

6. A tape reproducing direction detecting apparatus for a digital VTR as claimed in claim 4, in which said logic circuit includes two NAND gates, three AND gates and an OR gate.

* * * * *